(12) United States Patent
Aoki et al.

(10) Patent No.: US 7,256,525 B2
(45) Date of Patent: Aug. 14, 2007

(54) SLOT INSULATOR AND MULTIPLEXED RESOLVER USING SAME

(75) Inventors: Nao Aoki, Tokyo (JP); Hiroyuki Kujirai, Tokyo (JP)

(73) Assignee: Minebea Co., Ltd., Kitasaku-gun (JP)

( * ) Notice: Subject to any disclaimer, the term of this patent is extended or adjusted under 35 U.S.C. 154(b) by 23 days.

(21) Appl. No.: 11/232,040

(22) Filed: Sep. 22, 2005

(65) Prior Publication Data

US 2006/0091757 A1 May 4, 2006

(30) Foreign Application Priority Data

Nov. 4, 2004 (JP) .............................. 2004-321236

(51) Int. Cl.
  *H02K 3/34* (2006.01)
(52) U.S. Cl. ..................................................... 310/215
(58) Field of Classification Search ................ 310/214, 310/215, 71, 112
  See application file for complete search history.

(56) References Cited

U.S. PATENT DOCUMENTS 6,933,636 B2 * 8/2005 Miya et al. .................... 310/71

6,998,747 B2 * 2/2006 Kujirai et al. ............... 310/112

FOREIGN PATENT DOCUMENTS

| EP | 1 404 007 A1 | 3/2004 |
| EP | 1 473 548 A2 | 11/2004 |
| JP | 2001-95188 | 4/2001 |
| JP | 2001-169493 | 6/2001 |
| JP | 2002-171737 | 6/2002 |
| JP | 2003-23743 | 1/2003 |

* cited by examiner

*Primary Examiner*—Dang Le
*Assistant Examiner*—Nguyen Hanh
(74) *Attorney, Agent, or Firm*—Foley & Lardner LLP

(57) ABSTRACT

A slot insulator is provided and includes: an annular part; and a plurality of insulated winding parts disposed a circumference of the annular part. Each of the insulated winding parts has an insulated winding holding part and an insertion groove for housing a winding part of a tooth in a stator yoke. The insertion groove opens in one direction along a center axis of the annular plate and opens at both ends of the insertion groove in a radial direction of the annular plate.

4 Claims, 10 Drawing Sheets

SLOT INSULATOR AND MULTIPLEXED RESOLVER USING SAME

FIELD OF THE INVENTION

The present invention relates to a multiplexed resolver in which plural resolver units are fitted in a single case so that they integrally operate, and particularly to a slot insulator provided in an assembly in which all stator yokes of a multiplexed resolver are assembled.

One resolver unit means a structure constituting one resolver in a multiplexed resolver. The resolver unit has a function to detect a rotation angle, a rotation angle position and the like similarly to a resolver in the related art, and the resolver units are mainly stacked and coupled.

BACKGROUND OF THE INVENTION

FIG. 7 is a perspective view of a general stator yoke in one type of resolver.

A stator yoke 101 includes an outside cylindrical part 102, a winding part 103 facing toward the center from the cylindrical part 102, and a winding holding part 104 provided in a protruding condition at the tip of the winding part 103. A combination of the winding part 103 and the winding holding part 104 is called a tooth 105.

The winding holding part 104 is formed into a rectangular parallelpiped having a quadrate inward surface. The width of a protrusion 107 of a residual obtained by subtracting the width of the winding part 103 from the width of the winding holding part 104 in the circumferential direction is twice as large as a width L1 of a one-sided protrusion 106. Besides, the height of the stator yoke 101 in the center axis direction (direction of the center axis of the outside cylindrical part 102 of the stator yoke 101) is uniformly formed to be H1. The height of the one-sided protrusion 106 is also H1.

In the stator yoke 101 of FIG. 7, a winding (not shown) with insulating coating is wound around the winding part 103 through an insulator (not shown). The illustration of a rotor is omitted. As shown in FIG. 7, a resolver including one stator yoke 101 in which a number of teeth 105 are provided on one cylindrical part 102 and windings are wound around the teeth 105, and one rotor (not shown) is called a simplexed resolver. A multiplexed resolver, for example, an M-plexed resolver is such that basically, the resolver of FIG. 7 is made one resolver unit and M such resolver units are assembled and fixed.

As an insulator provided on the winding part 103, a slot insulator is used.

A pair of slot insulators are mounted (attached) to the stator yoke 101 of FIG. 7 so as to cover the stator yoke 101 from above and below in a direction along the center axis of the stator yoke 101 (see, for example, JP-A-2001-95188, JP-A-2001-169493 and JP-A-2002-171737).

In the case where the slot insulator is used, as compared with a case where a surface of a stator yoke is directly subject to insulating coating, and the winding is provided thereon, there are following merits. Thus, the slot insulator plays an important role at the time of mass production.

(1) In the case of the slot insulator, only a step of direct attachment to the stator yoke is used. On the other hand, in the case where the surface of the stator yoke is subjected to insulating coating, it is necessary to perform plural steps, such as a step of subjecting the stator yoke to the insulating coating and a step of drying it thereafter. Thus, in the case where the slot insulator is used, since the number of insulating process steps of the stator yoke becomes small, the assembling process is short, and manufacturing cost becomes low.

(2) Since the slot insulator is molded out of resin by a metal mold, the unit cost is low.

(3) In the case where an insulating coating material is applied, a gap such as a pinhole is produced in the coating due to uneven coating or the like. On the other hand, since the slot insulator is molded by injecting resin into the metal mold under high pressure, a gap such as a pinhole is not easily produced in the molded resin. Thus, in the slot insulator, insulation between the stator yoke and the coil is more easily ensured.

(4) In the case where an insulating coating material is applied, since the coating material is merely applied to an existing part, the structure can not be changed. On the other hand, since the slot insulator is molded out of resin, the shape and structure of a crossover guide, a winding protection part, a connector, a cover and the like can be freely designed and changed.

Incidentally, as the resolver, in addition to the above structure, a multiplexed (M-plexed) resolver in which plural (arbitrary M) resolver units are stacked into an integral assembly is known.

Also in the multiplexed resolver, although it has been examined to similarly use the slot insulator, this has not been realized.

Hereinafter, for reference, a structure relating to a slot insulator, which was attempted to be adopted for the multiplexed resolver and was not be realized, will be described.

FIG. 8 is a perspective view of a stator yoke in a duplexed resolver.

A stator yoke 1 of the duplexed resolver of FIG. 8 is the stator yoke of the duplexed resolver in which a structure of a simplexed resolver is made one resolver unit, and two such resolver units are stacked to form an integral assembly.

Winding parts 3 are provided on each of the upper and lower stator yokes 1 to be shifted so that they are not overlapped with each other at a common angle position on the circumference. A winding holding part 4 and the winding part 3 constitute a tooth 5.

The number of the teeth 5 and the interval are suitably set in relation to an axial double angle or the like. However, it is preferable that the arrangement of the respective teeth 5 in the circumferential direction is the arrangement in the order corresponding to the order of the resolver units, that is, the stator yokes.

An interval of a height H3 equivalent to the thickness of a cylindrical part 2 is produced between the winding parts 3 of the upper and lower stator yokes 1.

Although the above is an example of the duplexed resolver, the form of a triplexed or higher multiplexed resolver can be similarly constructed.

SUMMARY OF THE INVENTION

FIG. 9 is a perspective view of a slot insulator (hereinafter referred to as an imaginary slot insulator) for an integral duplexed resolver, which was not realized.

An imaginary slot insulator 301 is made of an insulating resin material, and includes an outside annular plate 302, insulated winding parts 303 facing toward the center from the annular plate 302, and insulated winding holding parts 304 provided in a protruding condition at the tips of the insulated winding parts 303. The insulated winding holding part 304 includes a pair of left and right shorter side parts 306 and a longer side part 305.

In the slot insulator 301 of FIG. 9, the insulated winding holding parts 304 in each which a longer side part 305 and a shorter side part 306 are coupled, are provided to be sifted correspondingly to the respective teeth of two stator yokes provided to form upper and lower two stages and to be shifted in the direction along the center axis of the annular plate 302.

In the winding holding part of the stator yoke, the shorter side part 306 is a portion protruding from the outside surface of the winding part toward an adjacent tooth, that is, a portion having an area of a width L1×height H2 in FIG. 9. The width L1 in the shorter side part 306 of FIG. 9 is the same as the width L1 of the one-sided protrusion 106 of the stator yoke 101 of FIG. 7. The height H2 in the shorter side part 306 of FIG. 9 is half of the height H1 of the one-sided protrusion of the stator yoke of FIG. 7.

When a pair of the slot insulators 301 are covered on a stator yoke from both sides of the cylindrical part of the stator yoke in the direction along the center axis, the total area of the pair of the shorter side parts 306 of the combined slot insulators 301 in the direction along center axis is made the same as the area of the one-sided protrusion of the stator yoke. When the structure as stated above is adopted, the one-sided protrusion of the winding holding part of the stator yoke is supported from the backside by the pair of the shorter side parts 306 opposite to each other, and the winding holding part of the stator yoke can be positioned and covered by the pair of the longer side parts 305 opposite to each other.

Besides, in the insulated winding part 303 of the slot insulator 301 shown in FIG. 9, an insertion groove 307 opening downward and toward both sides in the radial direction is provided. An opening of the insertion groove 307 at the inward end of the radial direction is provided between the pair of shorter side parts. The insertion groove 307 is constructed so that half of the winding part of the stator yoke can be housed. The winding part of the stator yoke can be covered from both sides by the pair of the half insulated winding parts 303.

By this, the shorter side part 306 can be constructed such that when the winding (not shown) is wound around the insulated winding holding part 303, the winding does not come in direct contact with the winding holding part of the stator yoke without the slot insulator 301.

The annular plate 302 is disposed to be in contact with the upper end surface and the lower end surface of the cylindrical part of the stator yoke assembly.

On the annular plate 302 of an annular plate body, the insulated winding parts 303 corresponding to the respective teeth of the first stage stator yoke are provided to protrude a direction toward a center of the annular plate 302, while the heights of the upper surfaces (upper surfaces when viewed in the center axis direction of the annular plate) are made uniform.

Besides, on extension plate parts 308 coupled at right angles (in the direction along the center axis) to the inside end of the annular plate 302, the insulated winding parts 303 corresponding to the respective teeth of the second stage stator yoke are similarly provided to protrude. The extension plate part 308 is made a shape obtained by cutting a part of a cylinder.

As shown in FIG. 10, a ring part 309 obtained by cutting a part of a ring, a crossover guide 310, and an engagement part 311 are provided on the annular plate 302. The ring part 309 stops the leakage of resin to the outside when a crossover (not shown) engaged with the crossover guide 310 is fixed by resin.

FIG. 10 is an imaginary view in which the imaginary slot insulator of FIG. 9 is applied to the integral duplexed resolver of FIG. 8. Since reference numerals in FIG. 10 are the same as those explained in FIGS. 8 and 9, their explanation will be omitted in FIG. 10.

When the stator yoke 1 is covered with the imaginary slot insulators 301 from above and below in the direction along the center axis of the cylindrical part, what is shown in FIG. 10 is expected.

In the example of FIG. 10, there has been a problem in the structure of the slot insulator of FIG. 9.

The slot insulator of FIG. 9 is manufactured by, for example, injection molding of insulating resin. In that case, there arise problems as set forth below.

(1) In the case of the injection molding, a position where an injection port (pouring gate) of resin is provided becomes a problem. Especially, the position of the injection port becomes important in order to supply resin to the end without lowering the temperature of the resin within the same level of time. When it takes much time or the temperature is lowered, the molten resin is solidified halfway, a gap becomes apt to be formed in the resin, and it becomes impossible to secure a creeping distance.

(2) The injection port is provided in a place having a large volume in order to facilitate inpouring. In the case of the slot insulator of FIG. 9, plural injection ports are provided on the annular plate at plural separate places. In that case, as compared with the insulated winding holding part close to the annular plate, and the longer side and shorter side parts at its end, it takes time to flow to a portion far from the annular plate, that is, the insulated winding part provided at the extension plate part coupled to the annular plate and its end, and the temperature is lowered, and accordingly, it is hard to let molten resin flow. Especially, in the case of the thin slot insulator, as the number of times of bending becomes large, the problem becomes noticeable.

When there is a thin portion, the flow of the molten resin becomes stagnant. When pressure is raised to improve the flow of the molten resin, a burr becomes apt to be produced. Further, it becomes difficult to form a mass production metal mold having reliability.

(3) In the case of the slot insulator of FIG. 9, since the structure is complicated, it is difficult to produce a metal mold for molding. Thus, in the multiplexed resolver, it was impossible to adopt the slot insulator.

(4) The crossover of the winding wound around the insulated winding part at the lower side of the annular plate in the direction along the center axis, which is separate from the annular plate, becomes long. Thus, in a winding process program of a winding nozzle, it becomes difficult to expect an accurate winding operation. Further, the fraction defective of the product is increased.

An object of an illustrative, non-limiting embodiment of the invention is to provide a slot insulator for a multiplexed resolver. Another object of an illustrative, non-limiting embodiment of the invention is to provide a multiplexed resolver having a slot insulator that has a simple structure so that resin molding becomes easy.

An illustrative, non-limiting embodiment of the invention is characterized in that a slot insulator of a multiplexed resolver, for example, an M-plexed resolver is not made to have a shape conforming to the arrangement position of teeth of an M-plexed stator yoke, but is made to have a shape corresponding to a simplexed resolver having the total slot number of M stator yokes.

With respect to a winding of a coil, an insulated winding part of a slot insulator in which a winding part of a stator yoke is not housed and an insulated winding part of a slot insulator in which a winding part of a stator yoke is housed are coupled into one body and the winding is wound.

In order to form an M-plexed resolver, in the case where stator yokes of M resolver units are assembled to form an assembly, since a pair of slot insulators are attached from both sides of the assembly, respective insulated winding parts and respective insulated winding holding parts of the pair of slot insulators, which correspond to respective teeth positions on a circumference, are formed to have such length that they can cover all teeth of the M stator yokes.

Specifically, following means are adopted.

(1) A slot insulator includes: an annular plate; and a plurality of insulated winding parts disposed along a circumference of the annular plate. Each of the insulated winding parts has an insulated winding holding part and an insulated winding insertion groove (i.e., an insertion groove) for housing a winding part of a tooth of a stator yoke. The insertion groove opens in one direction along a center axis of the annular plate and opens at both ends of the insertion groove in a radial direction of the annular plate.

(2) In the slot insulator as recited in (1), the insertion groove is for housing a winding part of a tooth of plural combined stator yokes.

(3) In the slot insulator as recited in (1) or (2), the insulated winding parts are disposed along an inner circumference of the annular plate and protrudes toward the center of the annular plate. The insulated winding holding part includes a pair of shorter side insulated winding holding parts (i.e., a pair of shorter side parts) and a longer side insulated winding holding part (i.e., a longer side part). Each of the pair of shorter side parts has a length (in a direction along the center axis of the annular plate), which is n times as large as a thickness of the stator yoke, where n is an integer.

The pair of shorter side parts along a circumferential surface of the annular plate is provided at both sides of an inward end of the insulated winding part in a length direction of the annular part. The longer side part connects to each of the pair of shorter side parts and is provided at a side opposite to an opening in the one direction along the center axis of the annular part, the opening being provided at the inward end of the insulated winding part in the radial direction of the annular part. That is, the longer side part connects to each of the pair of shorter side parts so that: the longer side part and the pair of shorter side parts surround an opening of the insertion groove on three sides at an inward end of the insulated winding part in the radial direction of the annular plate; and the pair of shorter side parts are arranged in a circumferential direction of the annular plate.

(4) In the slot insulator as recited in (3), the slot insulator includes a insulated winding part having a dummy insulated winding part that does not come in contact with a winding holding part of the stator yoke.

(5) In the slot insulator as recited in (1) or (2), the insulated winding parts are disposed along an outer circumference of the annular plate and protrude outward in the radial direction of the annular plate.

(6) In the slot insulator as recited in any one of (1) to (5), all of the insulated winding parts are located at a common height position with respect to a plate surface of the annular plate, and each of the insulated winding parts have the insulated winding holding part at a common height position with respect to the plate surface of the annular plate.

(7) In a multiplexed resolver in which a pair of slot insulators as recited in any one of (1) to (6) are attached from both sides of an assembly. That is, the assembly is sandwiched between the pair of slot insulators. The assembly includes m stator yokes are assembled, where m is an arbitrary integer. In a case where the integer m is divided into two integers p and q, one of the pair of slot insulators houses p stator yokes in the insertion groove thereof, and the other houses q stator yokes in the insertion groove thereof.

Exemplary effects of the invention are set forth below:

According to the slot insulator as recited in (1), the parts of the slot insulator for the respective teeth can be made to have similar shapes, and the structure of the slot insulator can be made simple so that metallic molding can be easily performed. The winding can be wound at a common height position and in a common coil shape. The winding part of the tooth of the stator yoke can be housed by the insertion groove of the insulated winding part, and it becomes unnecessary to use an extension plate part shown in FIG. 9. Besides, since the insulated winding part can be provided along the circumference of the annular plate, the structure of the slot insulator can be made such that resin molding of a portion extending onward from the insulated winding part becomes easy.

According to the slot insulator as recited in (2), the winding part at an arbitrary position in the plural multiplexed stator yokes can be housed in the slot insulator.

According to the slot insulator as recited in (3), the winding part at an arbitrary position in the plural multiplexed stator yokes can be housed in the insertion groove. Besides, the insulated winding holding part can be held in the state where it is insulated from the winding by the shorter side parts and the longer side part.

According to the slot insulator as recited in (4), the winding holding part of the stator yoke can be held by the longer side part and the dummy insulated winding holding part.

According to the slot insulator as recited in (5), the outer rotor type resolver can be constructed.

According to the slot insulator as recited in (6), the structure can be made such that when resin molding is performed, a difference does not occur in resin filling passages.

According to the multiplexed resolver as recited in (7), not only in the case where the number of combined stator yokes is even, but also in the case where the number of combined stator yokes is odd, the multiplexed resolver including the slot insulators can be constructed.

DETAILED DESCRIPTION OF THE INVENTION

Exemplary embodiments of the invention will be described in detail with reference to the drawings.

EMBODIMENT 1

Figure 8:
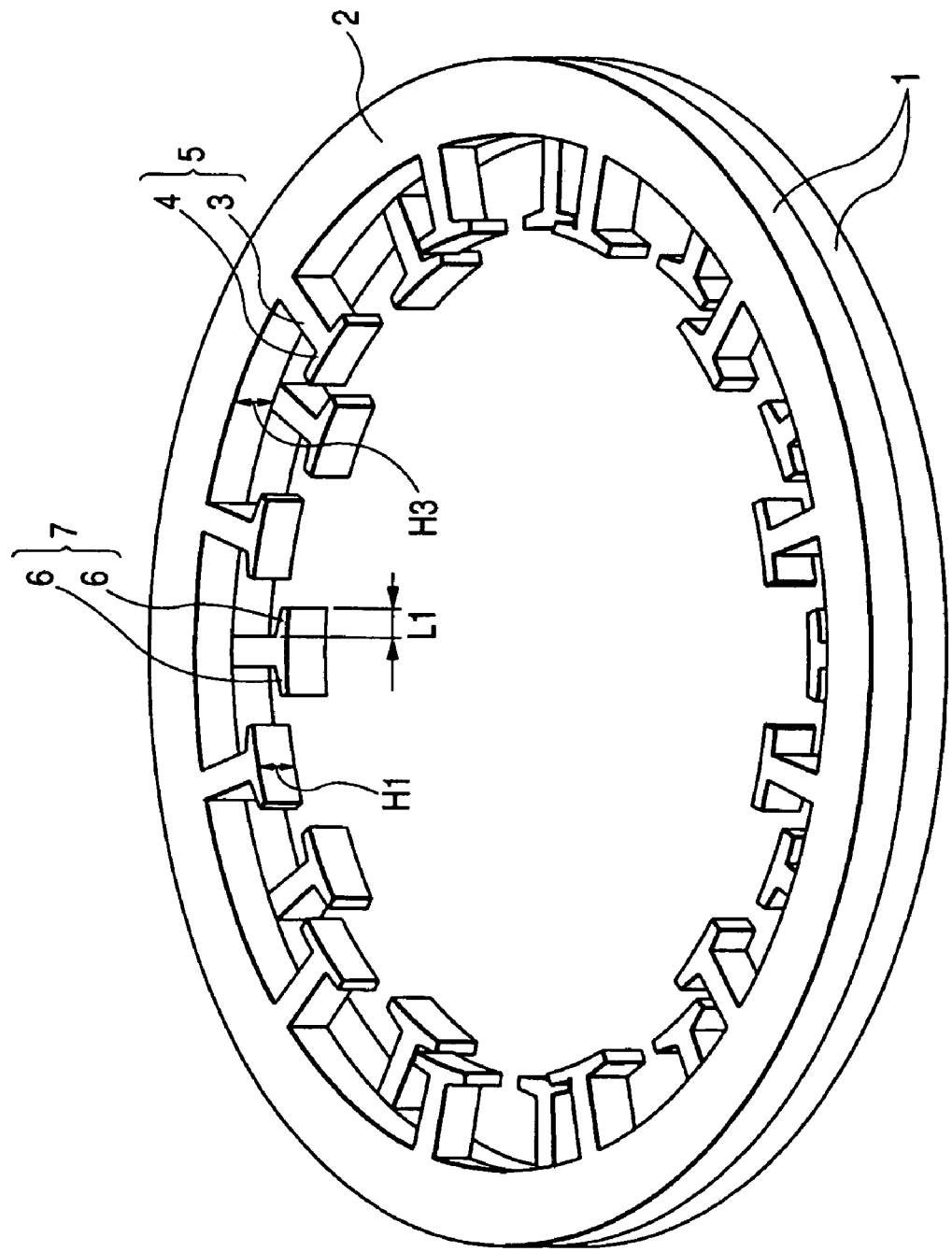
FIG. 8 is a perspective view of a stator yoke in a duplexed resolver.
Figure 9:
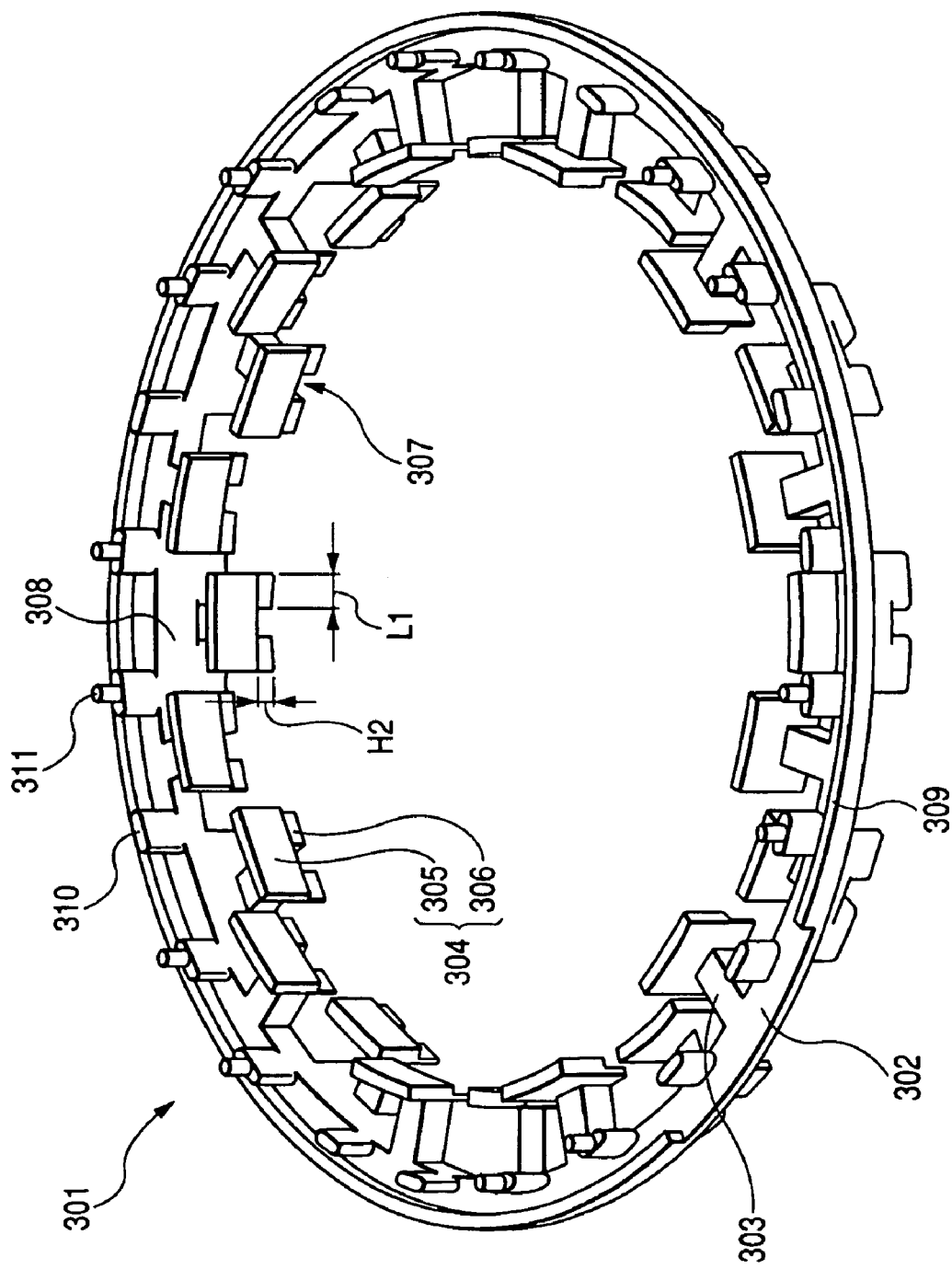
FIG. 9 is a perspective view of an imaginary slot insulator for an integral duplexed resolver.
Figure 10:
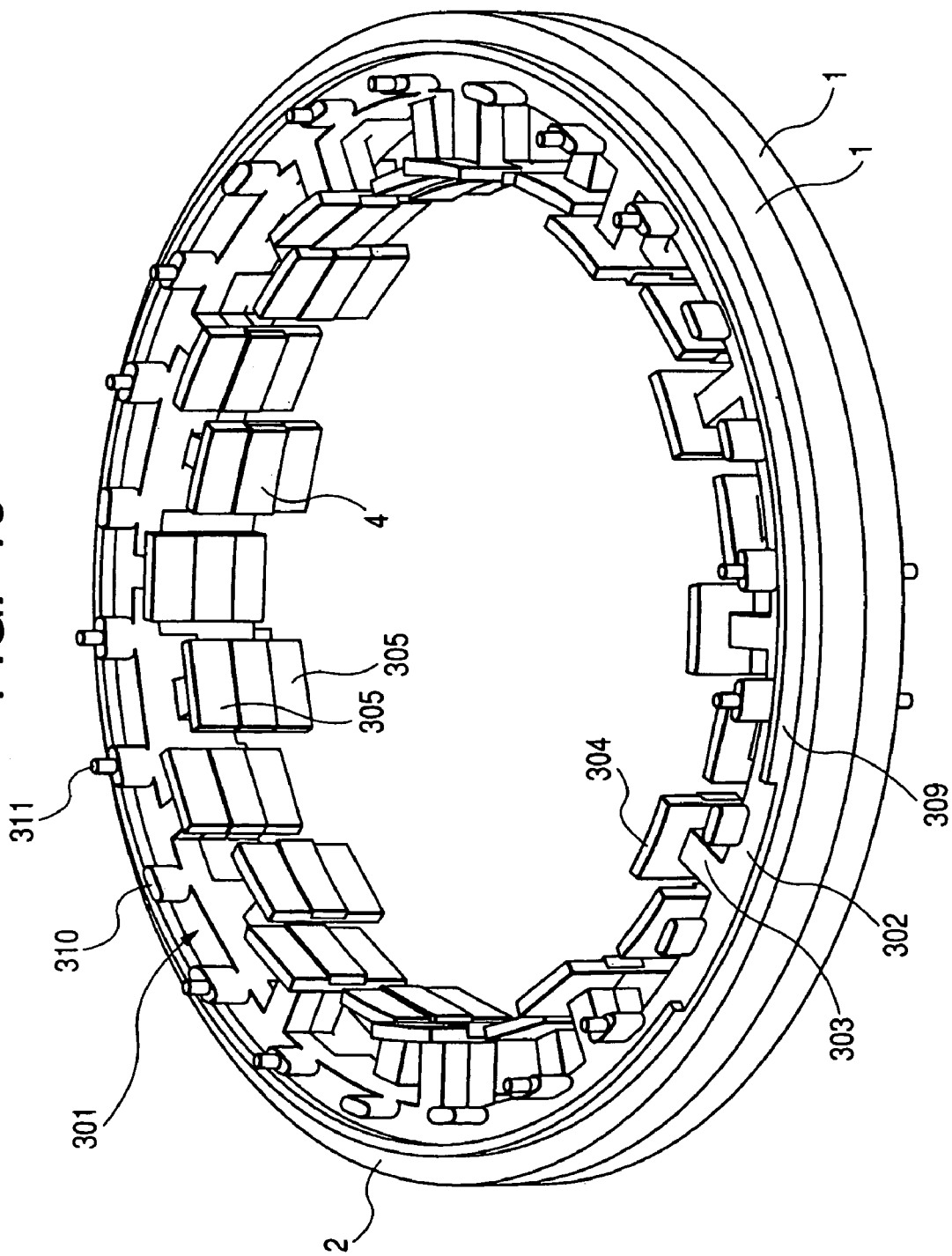
FIG. 10 is an imaginary view in which an imaginary slot insulator of FIG. 9 is applied to the stator yoke in the integral duplexed resolver of FIG. 8.

FIG. 8 is a perspective view of a general stator yoke structure of a duplexed resolver.

Each of stator yokes 1 includes an outside cylindrical part 2, winding parts 3 protruding toward the center from the cylindrical part 2, and winding holding parts 4 provided in a protruding condition at the tips of the winding parts 3. A combination of the winding part 3 and the winding holding part 4 is called a tooth 5.

The winding holding part 4 is formed to be a plate-like body part having an arc surface. The width of a protrusion 7 of a residual obtained by subtracting the width of the winding part from the width of the winding holding part 4 in the circumferential direction is twice as large as a width L1 of a one-sided protrusion 6. Besides, the height of the stator yoke 1 in the center axis direction (the direction along the center axis of the cylindrical part 2) is uniformly formed to be a predetermined height H1. The height of the one-sided protrusion is also H1.

In the stator yoke 1 of FIG. 8, an insulation coated wire (not shown) is wound around the winding part 3 through an insulator. The illustration of a rotor is omitted.

A resolver including the stator yoke 1 in which a number of teeth 5 are provided in one cylindrical part 2 and a winding (not shown) is wound around each of the teeth 5 and a rotor (not shown) is called a simplexed resolver. A multiplexed resolver, for example, an M-plexed resolver is such that basically, the resolver of FIG. 8 is one resolver unit, and M such resolver units are combined into one body.

As the insulator provided on the winding part 3, a slot insulator is used.

The slot insulator attached to the stator yoke 1 of FIG. 8 is constructed such that one of a pair of slot insulators is attached from above and the other of the pair is attached form below in the center axis direction.

Figure 1:
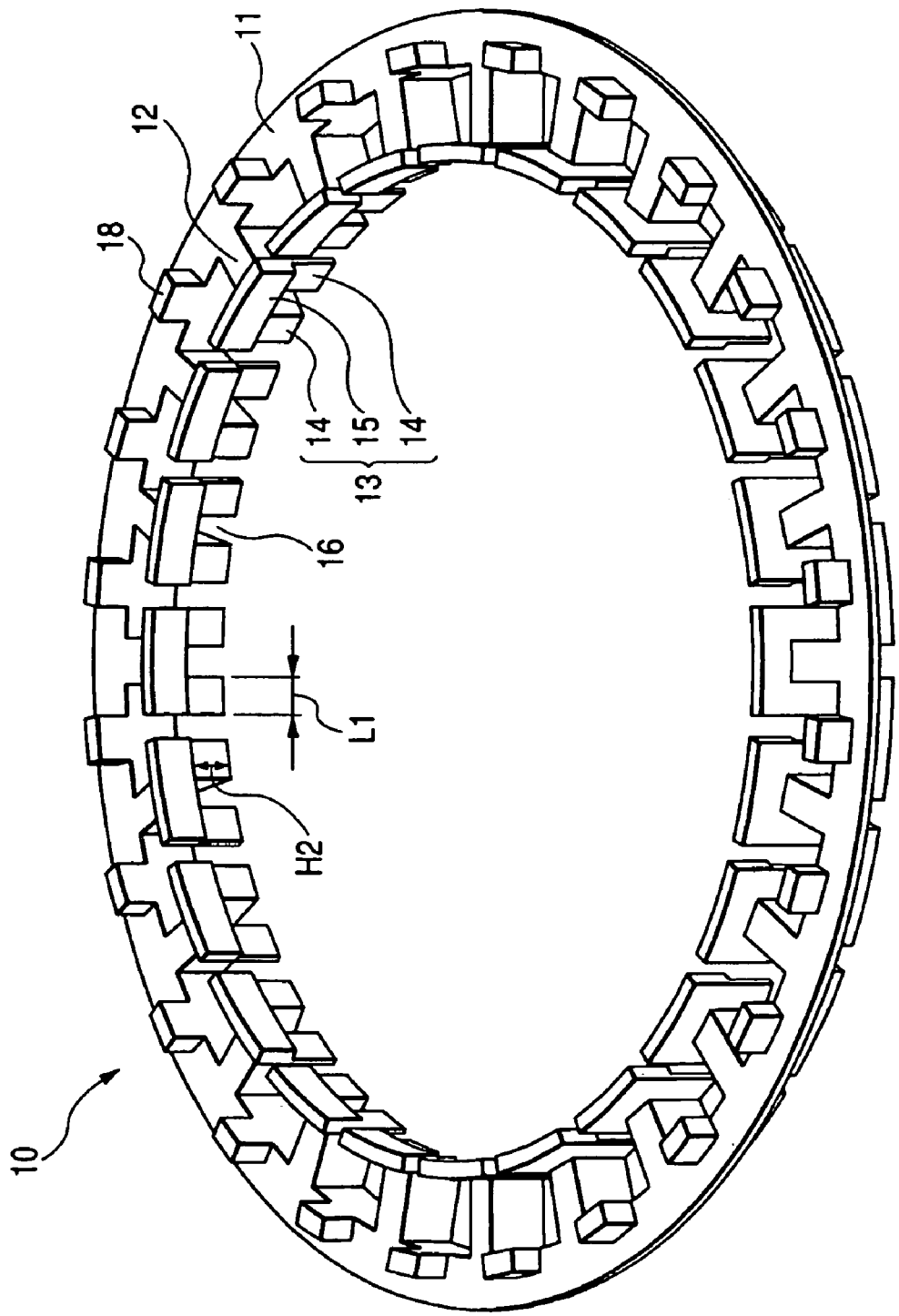
FIG. 1 is a perspective view of a slot insulator attached to a stator yoke assembly of a duplexed resolver of FIG. 8.

FIG. 1 is a perspective view of a slot insulator mounted to a stator yoke assembly of the duplexed resolver of FIG. 8.

A slot insulator 10 is made of insulating resin material and includes an annular plate 11 having an outside annular plate, insulated winding part 12 protruding toward the center from the annular plate 11, and insulated winding holding parts 13 provided in a protruding condition at the tips of the insulated winding parts 12.

The insulated winding holding part 13 includes a pair of left and right shorter side parts 14 and 14 and a longer side part 15.

Each of the pair of shorter side parts 14 has a length in the center axis direction of the annular plate (i.e., the direction along the center axis of the annular plate), which is n times as large as the thickness of one stator yoke, where n is an arbitrary integer.

An insertion groove 16 for housing the winding part 3 of the tooth 5 of the stator yoke 1 is provided in the insulated winding part 12. The insertion groove 16 is provided in the insulated winding part 12 so as to open in one direction along the center axis of the annular plate 11 and to open at both ends of the insertion groove 16 in the radial direction of the annular plate 11. The opening of the insertion groove 16 at an inward end in the radial direction is provided between the pair of shorter side parts 14 and 14.

The pair of shorter side parts 14 and 14 along the circumferential surface (i.e., in the circumferential direction of the annular plate 11) is provided at both sides of the inward end of the insulated winding part 12 in the length direction (i.e., in the radial direction of the annular plate 11). The longer side part 15 is provided at the side opposite to the opening in the one direction along the center axis of the annular plate 11, the opening being provided at the inward end of the insulated winding part 12 in the radial direction of the annular plate 11.

That is, the pair of shorter side parts 14 and 14 and the longer side part 15 surround the opening of the insertion groove 16 on three sides at the inward end of the insulated winding part 12 in the radial direction of the annular part 11.

In the case of embodiment 1, the one shorter side part 14 corresponds to a portion, in the winding holding part of the stator yoke, protruding from the outside surface of the winding part to the adjacent tooth side, that is, the one-sided protrusion 6 having the area of the width L1×height H1 in FIG. 8. A height H2 of the shorter side part 14 of FIG. 1 becomes the height H1 of the one-sided protrusion 6 of the stator yoke 1 of FIG. 8.

When a pair of the slot insulators 10 of FIG. 1 are attached to the assembly of the stator yokes 1 and 1 from both sides in the center axis direction of the assembly of the stator yokes 1 and 1 of FIG. 8 (see FIG. 2), at each of the teeth positions, the ratio of the area of the pair of the shorter side parts 14 and 14 of the pair of the combined slot insulators 10 and 10 to the area of the pair of the one-sided protrusions of the stator yoke becomes the number of resolver units of the multiplexed resolver, that is, 2 in the case of embodiment 1.

That is, at each of the teeth positions on the circumference of the cylindrical part 2 in the stator yoke 1, there are two pairs of the shorter side parts 14 and 14 of the pair of the combined slot insulators 10 and 10. On the other hand, in the stator yoke 1, there is one tooth 5, that is, one pair of the one-sided protrusions 6. This means the area ratio of 2:1, which is consistent with 2, that is, the number of resolver units of the duplexed resolver.

In other words, the insertion groove 16 is constructed to be capable of housing the winding part of the tooth of the plural combined stator yokes.

When the structure as stated above is adopted, the winding holding part 4 of the stator yoke 1, the position of which is vertically changed in the center axis direction, can be positioned and be covered between the pair of longer side parts 15 and 15 vertically facing to each other. Besides, the winding part 3 of the stator yoke 1 can be housed in the insertion groove 16 of the pair of the insulated winding parts 12 and 12 vertically facing to each other. (See FIG. 2.)

By this, the pair of shorter side parts 14 and 14 and the longer side part 15 can be constructed such that when the winding is wound around the insulated winding part 12, the winding does not come in direct contact with the winding holding part directly without the slot insulator 10.

The plate surface of the annular plate 11 is made the reference position, and all the insulated winding parts 12 are provided at the common height position. Besides, all the insulated winding holding parts 13 are provided at the common height position. By this, the flow of resin at the time of resin molding can be improved.

The annular plates 11 are disposed to be in contact with the upper and lower surfaces of the cylindrical parts 2 of the stator yoke assembly.

Figure 2:
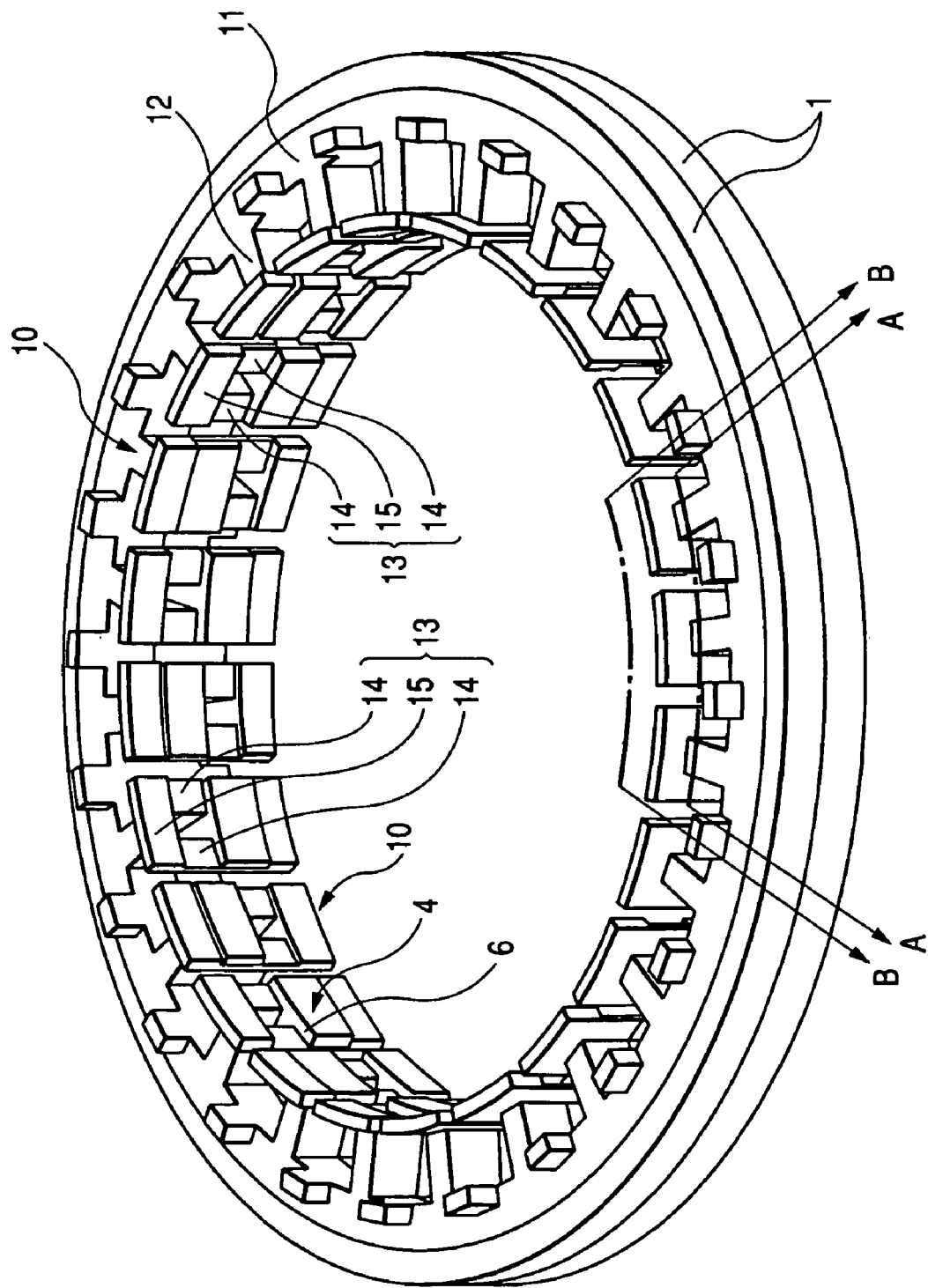
FIG. 2 is an assembly perspective view of a stator yoke assembly of a duplexed resolver in which the assembly is sandwiched between a pair of slot insulators shown in FIG. 1.

FIG. 2 is an assembly perspective view in which a pair of the slot insulators shown in FIG. 1 is attached to the stator yoke assembly of the duplexed resolver from both sides.

At the time when the slot insulators are attached, while the annular plate 11 of the slot insulator 10 is brought into contact with the surface of the cylindrical part of the stator yoke assembly, the winding part 3 of the stator yoke 1 is attached to the insertion groove 16 of the insulated winding part 12, and at the same time, the protrusion of the winding holding part 4 of the stator yoke 1 is brought into contact with the inward surface of the shorter side part 14, and the upper side of the winding holding part 4 is brought into contact with the lower surface of the longer side part 15.

The positioning of the winding holding part 4 of the stator yoke 1 in the radial direction is performed by the shorter side part 14. The positioning of the winding holding part 4 and rotation prevention are performed by the longer side part 15.

The respective teeth 5 of the stator yoke assembly are disposed in order in one direction of the circumferential direction of the cylindrical part 2 and vertically alternately in one direction of the center axis direction of the cylindrical part 2. That is, it is preferable that the height position is periodically changed with the rotation.

The pair of the shorter side parts 14 and 14 of the upper slot insulator 10 and the pair of the shorter side parts 14 and 14 of the lower slot insulator 10 support or hold the winding holding parts 4 vertically alternately in the order of the teeth 5. Thus, the structure is such that the winding holding part 4 of the stator yoke 1 is supported or held by one pair of the upper pair and the lower pair of shorter side parts 14 and 14, and the winding holding part 4 is not supported or held by the other pair.

Figure 5A:
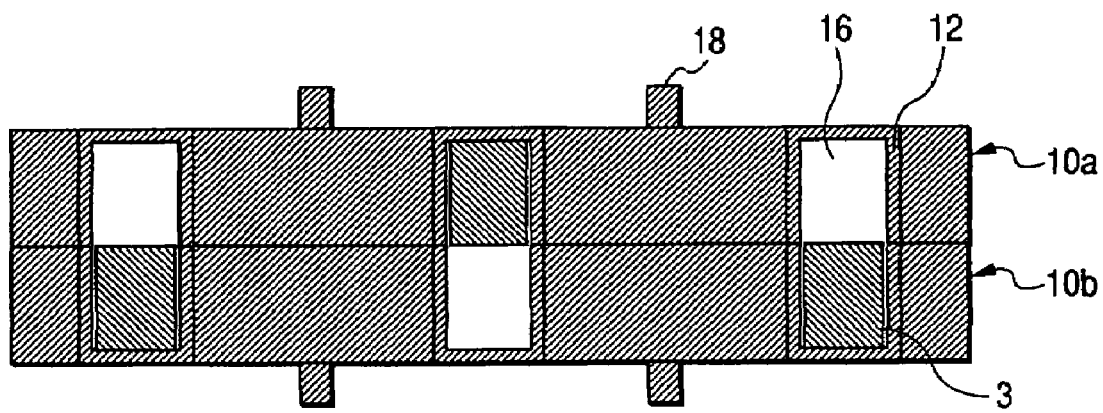
FIGS. 5A and 5B are main part sectional views of FIG. 2.
Figure 5B:
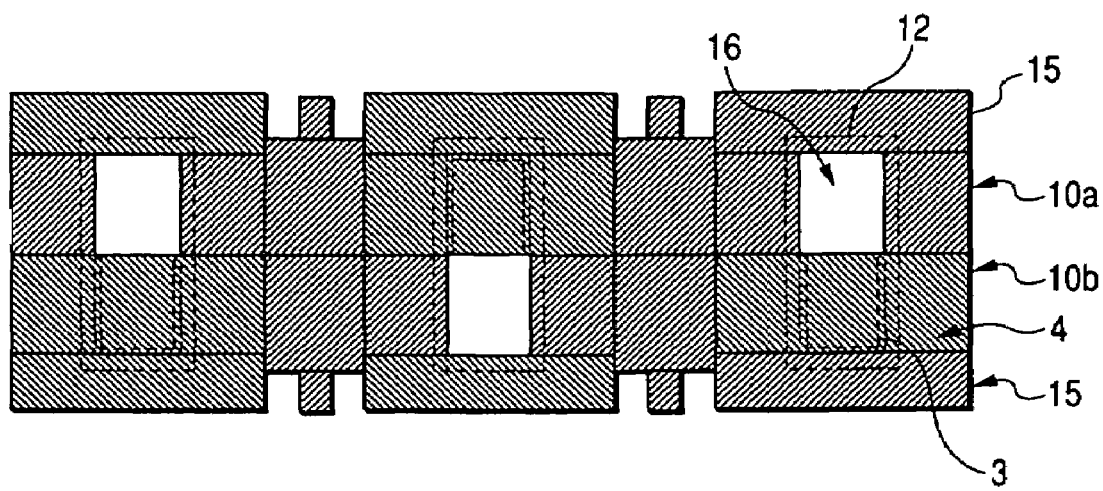

FIGS. 5A and 5B are main part sectional views of FIG. 2. FIG. 5A is a sectional view along line A-A of FIG. 2, and FIG. 5B is a sectional view along line B-B of FIG. 2.

FIG. 5A is a sectional view in which the outside from the insulated winding part 12 is cut, and shows an assembly in which slot insulators 10a and 10b including the insulated winding parts 12 provided with the insertion grooves 16 are combined with each other. The winding parts 3 of the teeth of the two stator yokes constituting the duplexed resolver are disposed one by one in the vertically halved regions in the insertion grooves 16, respectively. A region in the insertion groove 16 in which the winding part 3 is not disposed is constructed as a space in which nothing is disposed.

FIG. 5B is a sectional view in which the outside from the winding holding part 4 is cut. The winding holding part 4 is provided at the tip of the winding part 3. The longer side part 15 in contact with the side surface of the winding holding part 4 and the pair of shorter side parts in contact with the back surface of the winding holding part 4 are provided at the tip of the insulated winding part 12 of the slot insulator 10b. At the tip of the insulated winding part 12 of the slot insulator 10a, the longer side part 15 is provided at a position, and the pair of shorter side parts are provided at a position lower than the position of the longer side part 15 by the thickness of the winding holding part 4. The insertion groove 16 of the slot insulator 10a remains as a space where nothing is disposed.

(Winding)

As shown in FIGS. 5A and 5B, the longer side part 15 of the one slot insulator 10a, the pair of shorter side parts 14 and 14 of the one slot insulator 10a, the pair of shorter side parts 14 and 14 of the other slot insulator 10b, and the longer side part 15 of the other slot insulator 10b are disposed in order in one direction along the center axis of the cylindrical part 2 (the annular plate 11). The winding (not shown) is wound on the insulated winding parts 12 and 12 of both the slot insulator 10a and 10b in the state where the winding holding part 4 of the stator yoke 1 is supported or held by the pair of shorter side parts 14 and 14 of one of the slot insulators.

(Effects of Embodiment 1)

Since the slot insulator for the multiplexed resolver is made the slot insulator corresponding the simplexed resolver and corresponding to all teeth, the structure can be made simple.

A pair of slot insulators are combined, and all shapes of the pairs of the insulated winding parts and all shapes of the pairs of the insulated winding holding parts can be made equal to one another. As a result, even if the position of the tooth changes vertically in the center axis direction in the duplexed resolver, the positions of the windings and the coil sizes can be made equal to one another.

Since the coil sizes can be made equal to one another as set forth above, even if there is a structure in which the winding part of the tooth is not inserted in the insertion groove of the insulated winding part of the slot insulator, all the teeth have the common coil condition, and accordingly, a variation in output can be suppressed.

Since the shapes of the pair of slot insulators can be made the common shape, the structure is simple and the manufacture becomes easy.

Irrespective of whether the tooth is provided in the upper stator yoke or the lower stator yoke, it can be attached in common to the insulated winding holding part including the pair of shorter side parts and the longer side part.

Incidentally, an arbitrary multiplexed resolver also has the above effects.

EMBODIMENT 2

Figure 3:
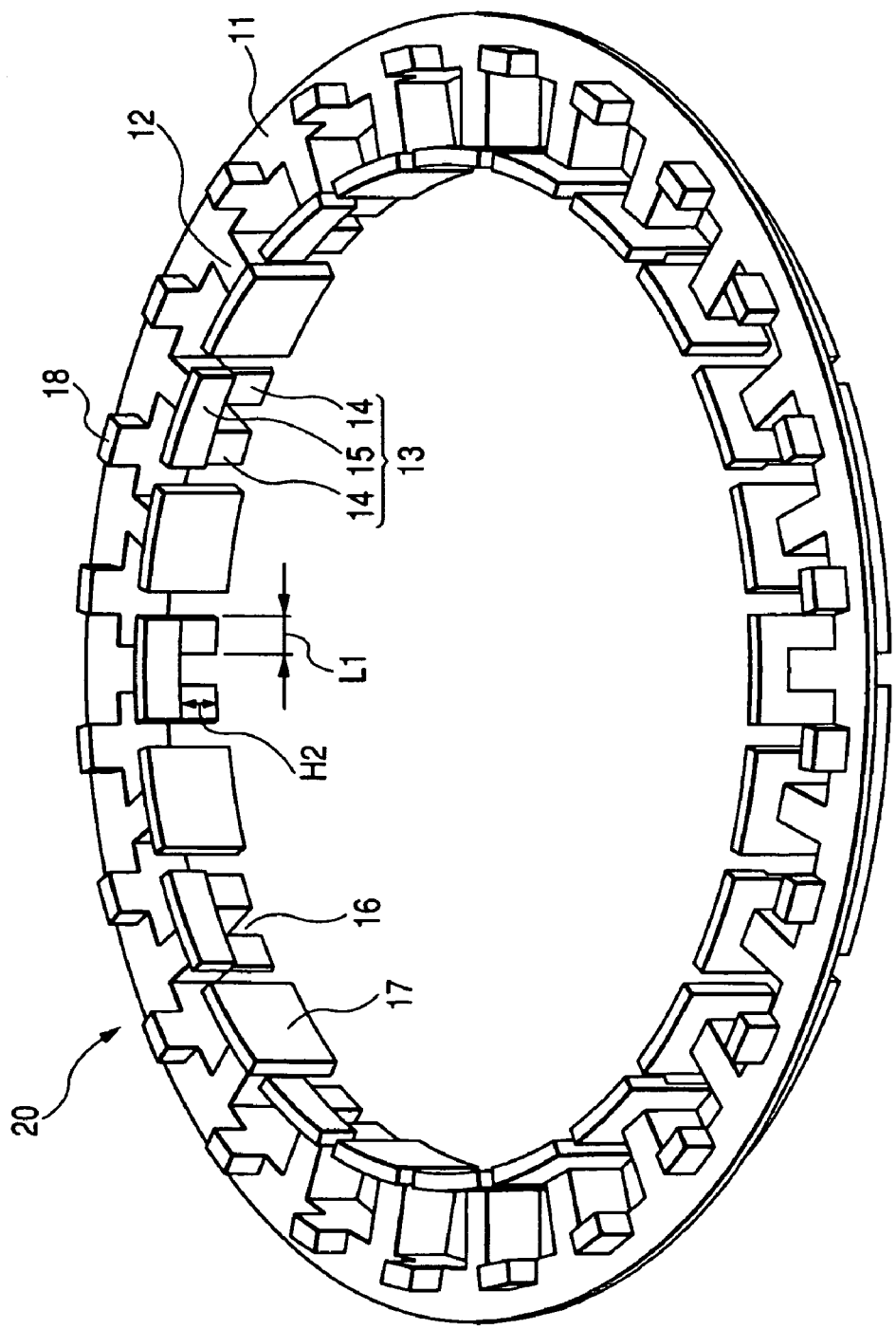
FIG. 3 is a view of a modified example of the slot insulator of FIG. 1.

FIG. 3 is a modified example of the slot insulator of FIG. 1.

In FIG. 3, same components as those of the embodiment of FIG. 1 are denoted by same reference numerals and their explanation will be omitted.

In FIG. 3, a slot insulator 20 has such a structure that the insulated winding part 12 having the insulated winding holding part 13 including the pair of shorter side parts 14 and 14 and the longer side part 15 in FIG. 1 and a insulated winding part 12 having a dummy insulated winding holding part 17 is alternately disposed in one direction of the circumference of the annular plate 11.

The dummy insulated winding holding part 17 is formed as a plate-like part having an arc surface including a pair of shorter side parts 14 and 14 and a longer side part 15. The thickness of the dummy insulated winding holding part 17 in the radial direction (equivalent to the radial direction of an annular plate 11) is made equal to the thickness of the longer side part 15 in the radial direction of the annular plate 11.

Figure 4:
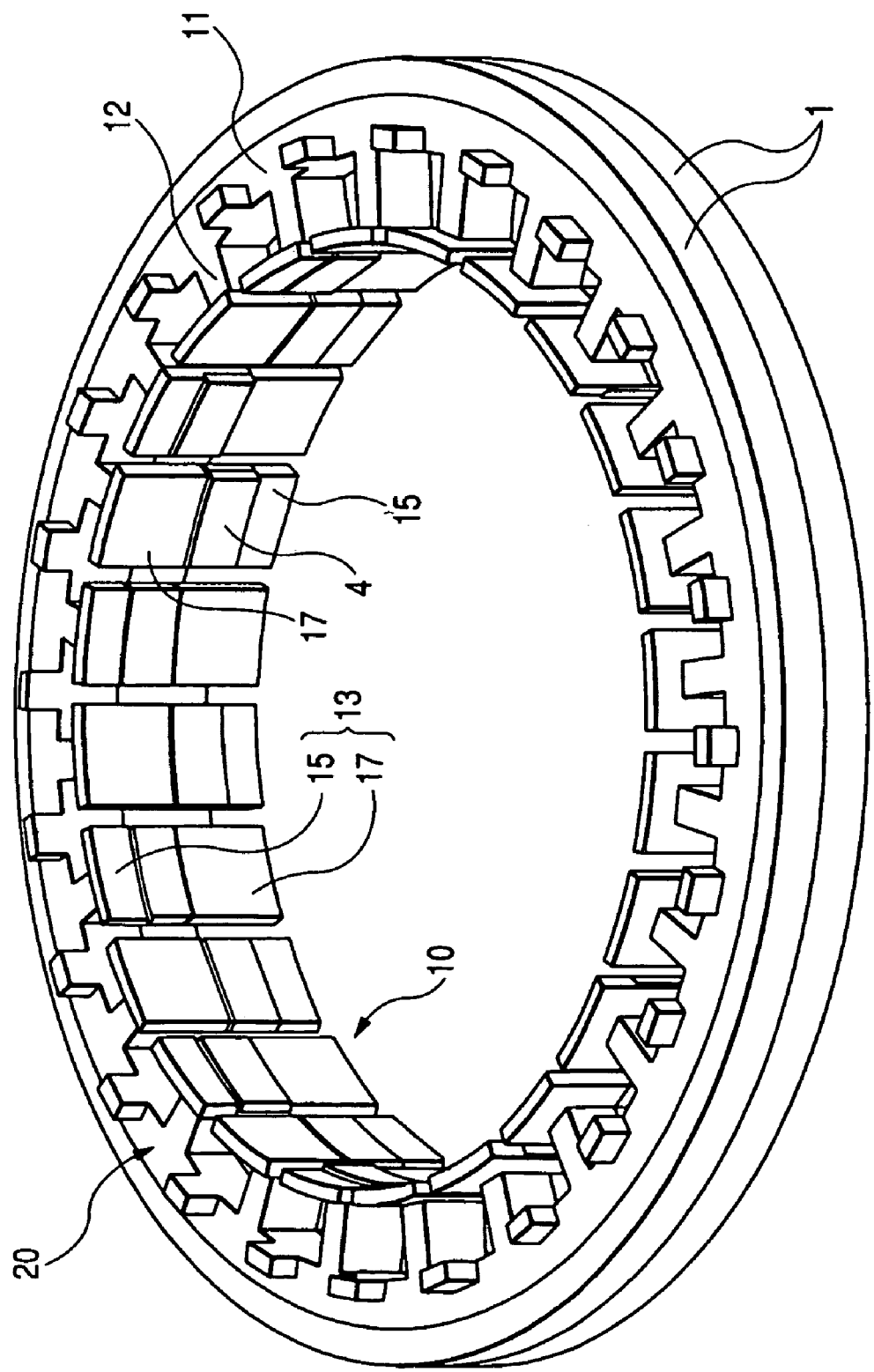
FIG. 4 is an assembly perspective view of a stator yoke assembly of a duplexed resolver in which the assembly is sandwiched between a pair of slot insulators shown in FIG. 3.

FIG. 4 is an assembly perspective view in which a pair of the slot insulators shown in FIG. 3 is attached to a stator yoke of a duplexed resolver from both sides.

At the time when the slot insulators 20 are attached, similarly to the case of embodiment 1, the pair of slot insulators 20 is attached to the upper and lower surfaces of the stator yoke assembly.

In the case of embodiment 1 of FIG. 2, the structure is such that in the pair of the upper and lower shorter side parts 14 and 14, the winding holding part 4 of the stator yoke 1 is attached to one of them, and the winding holding part 4 is not attached to the other.

On the other hand, in the case of embodiment 2 of FIG. 4, the slot insulator 20 side to which the winding holding part 4 of the stator yoke 1 is attached is constructed as the pair of shorter side parts 14 and 14, and the slot insulator 20 side to which the winding holding part 4 of the stator yoke 1 is not attached is constructed as the dummy insulated winding holding part 17.

In the case of embodiment 2 of the duplexed resolver of FIG. 4, the dummy insulated winding holding part 17 is alternately provided in the upper and lower slot insulators 20 in the center axis direction (center axis direction of the annular plate) toward one direction of the circumferential direction (equivalent to the circumferential direction of the annular plate 11).

(Effects of Embodiment 2)

In the case of embodiment 2, in the assembly state of FIG. 3, the winding holding part of each of the teeth of the stator yoke can be positioned and fixed by putting it between the dummy insulated winding holding part and the longer side part. The insertion groove is not exposed.

EMBODIMENT 3

Figure 6A:
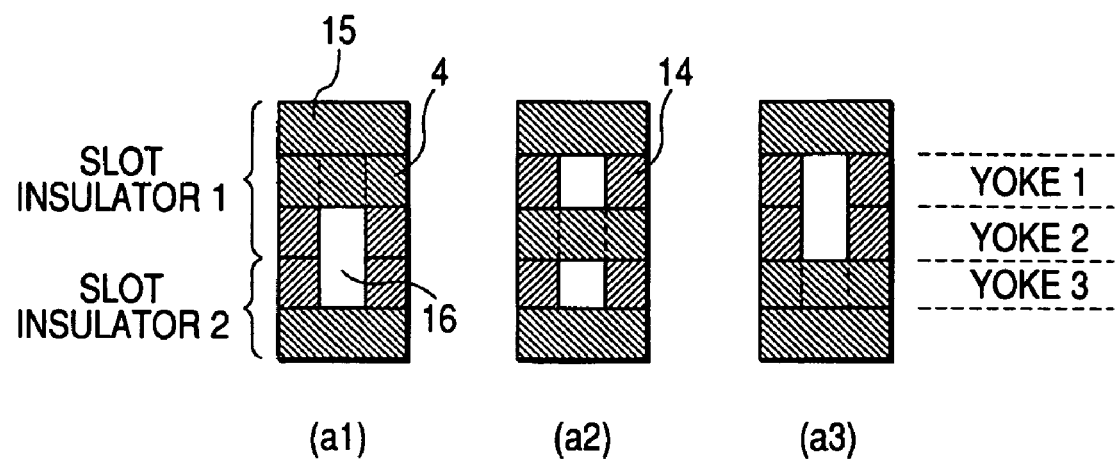
FIGS. 6A and 6B are explanatory views of a case of a triplexed resolver.
Figure 6B:
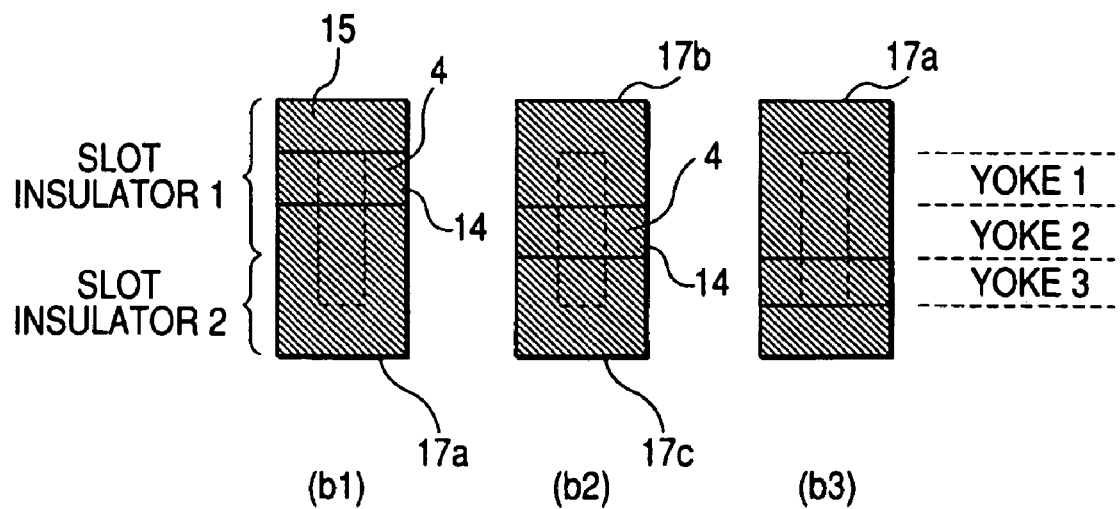
Figure 7:
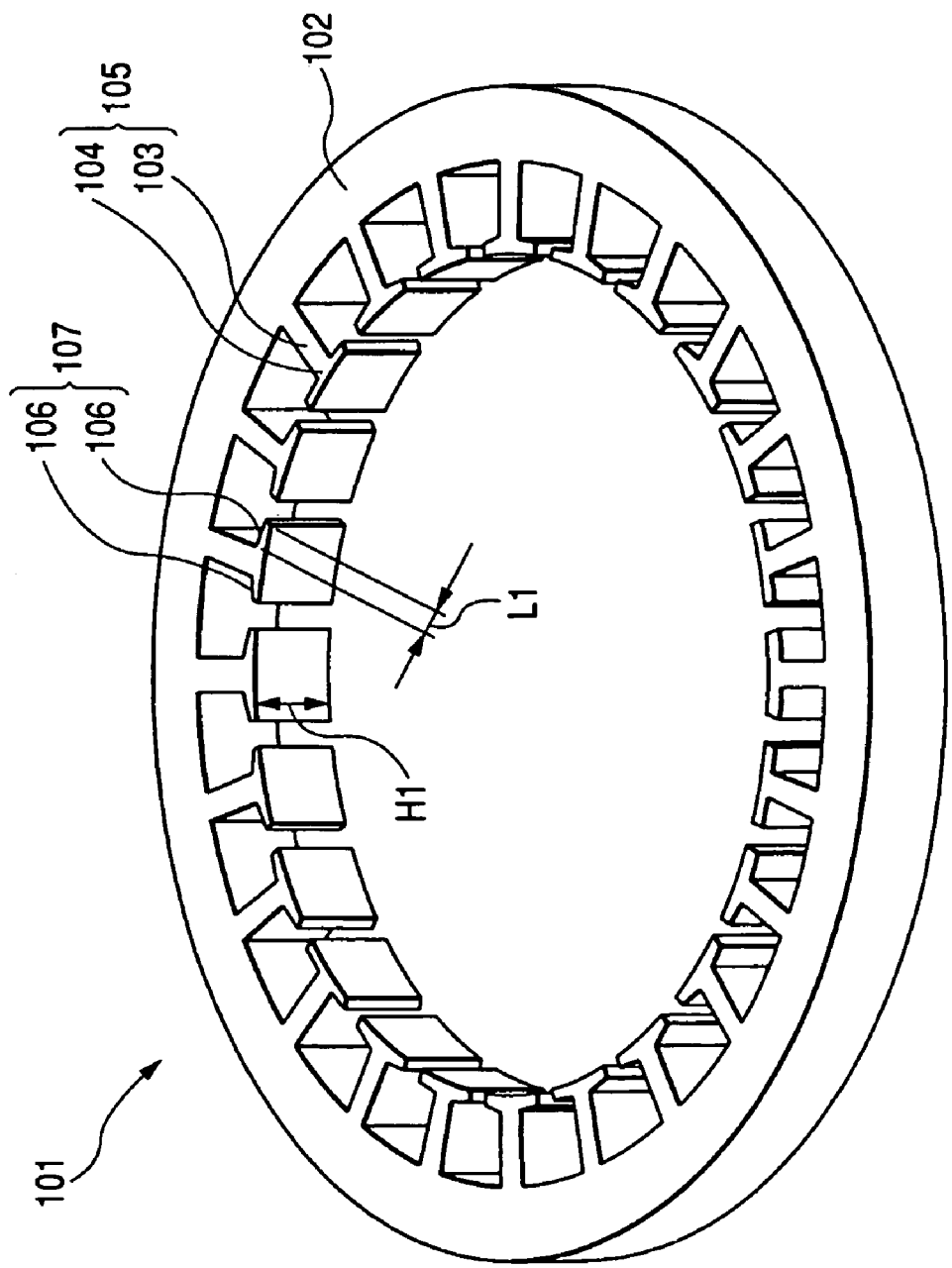
FIG. 7 is a perspective view of a general stator yoke of a resolver.

FIGS. 6A and 6B are explanation views of a case of a triplexed resolver.

FIG. 6A is a structural view of an insulated winding holding part of a case of a triplexed resolver using the slot insulator of FIG. 1. FIG. 6B is structural view of an insulated winding holding part of a case of a triplexed resolver using the slot insulator of FIG. 3.

In FIG. 6A, a stator yoke is made to have an assembly structure of a yoke 1, a yoke 2 and a yoke 3.

An insulated winding holding part of a slot insulator 1 is constructed such that a longer side part 15, a pair of shorter side parts 14 and 14 corresponding to the yoke 1, and a pair of shorter side parts 14 and 14 corresponding to the yoke 2 are continuously provided from above as shown in FIG. 6A.

An insulated winding holding part of a slot insulator 2 is constructed such that a longer side part 15, and a pair of shorter side parts 14 and 14 corresponding to the yoke 3 are continuously provided from below as shown in FIG. 6A. The insulated winding holding part of the slot insulator is constructed in stator yoke units.

An example (a1) is a mode of a case where the winding holding part 4 is provided in the yoke 1. An example (a2) is a mode of a case where the winding holding part 4 is provided in the yoke 2. An example (a3) is a mode of a case where the winding holding part 4 is provided in the yoke 3. Two insertion grooves 16 always remain as a space where nothing is disposed.

Also in FIG. 6B, a stator yoke is made to have an assembly structure of a yoke 1, a yoke 2 and a yoke 3.

In an example (b1), an insulated winding holding part of a slot insulator 1 is constructed such that a longer side part 15, and a pair of shorter side parts 14 and 14 corresponding to the yoke 1 are continuously provided from above as shown in FIG. 6B.

An insulated winding holding part of a slot insulator 2 is a dummy insulated winding holding part 17a.

In an example (b2), in an insulated winding holding part of the slot insulator 1, a double longer side part 17b, and a pair of shorter side parts 14 and 14 corresponding to the yoke 2 are continuously provided from above as shown in FIG. 6B. A dummy insulated winding holding part 17c is provided in a slot insulator 2.

In an example (b3), an insulated winding holding part of a slot insulator 1 is a dummy insulated winding holding part 17a. An insulated winding holding part of a slot insulator 2 is constructed such that a longer side part 15 and a pair of shorter side parts 14 and 14 corresponding to the yoke 3 are continuously provided from below as shown in FIG. 6B.

In the case where the multiplexed resolver is formed, in the arrangement of the winding holding parts 4 of the stator yoke, for example, the definite order of from (a1) to (a3) is determined. Besides, also in the arrangement of the dummy insulated winding holding parts 17a and 17c, for example, the definite order from (b1) to (b3) is determined.

These orders are required so that when a pair of slot insulators having the common shape is attached from both sides of an assembled multiplexed stator yoke, the stator yoke is correctly contained in the slot insulators.

As compared with the insulated winding holding part, the dummy insulated winding holding parts 17a and 17c have a feature that they do not include a pair of shorter side parts 14 and 14. Accordingly, the shape of the plate-like body part having the arc surface of the dummy insulated winding holding part is determined according to the degree of the multiplexing.

EMBODIMENT 4

The above embodiments have inner rotor type structures. In embodiment 4, a description will be given to an embodiment of an outer rotor type slot insulator and a multiplexed resolver using the slot insulator while quoting these structures.

In the slot insulator of FIG. 1 or FIG. 3, a plurality of insulated winding parts protruding outward in the radial direction of an annular plate are provided along the outer circumference of the annular plate, and the insulated winding holding parts are provided at the insulated winding parts. The explanation set forth above is applied to the structures of the respective parts.

A stator yoke has a structure corresponding to the outer rotor type slot insulator. The explanation set forth above is quoted also for the respective structures of the outer rotor type stator yoke. The explanation as set forth above is quoted also for multiplexing of the outer rotor type resolver.

While the invention has been particularly shown and described with references to embodiment thereof, it will be understood by those skilled in the art that various changes in form and details may be made therein without departing from the spirit and scope of the invention as defined by the appended claims.

The present application claims foreign priority based on Japanese Patent Application No. JP2004-321236 filed on Nov. 4 of 2004, the contents of which is incorporated herein by reference.

What is claimed is:

1. A slot insulator, comprising:

an annular plate; and a plurality of insulated winding parts disposed along a circumference of the annular plate, comprising:

a pair of shorter side parts, each having a length in a center axis direction of the annular plate, which is n times as large as a thickness of a stator yoke, wherein n is an integer, and the pair of shorter side parts are arranged in a circumferential direction of the annular plate; and a longer side part which connects to each of the pair of shorter side parts so that the longer side part and the pair of shorter side parts surround an opening of an insertion groove on three sides at an inward end of the insulated winding part in a radial direction of the annular plate, wherein the insulated winding parts are disposed along an inner circumference of the annular plate and protrudes toward a center of the annular plate;

wherein each of the insulated winding parts has an insulated winding holding part and the insertion groove capable of housing a winding part of a tooth in plural combined stator yokes, and the insertion groove opens in one direction along a center axis direction of the annular plate and opens at both ends of the insertion groove in the radial direction of the annular plate; and wherein the insertion groove is a groove capable of housing the winding part of the tooth in plural stator yokes combined in the center axis direction.

2. The slot insulator according to claim 1, which comprises an insulated winding part having a dummy insulated winding holding part that does not come in contact with a winding holding part of the stator yoke.

3. The slot insulator according to claim 1, wherein all of the insulated winding parts are located at a common height position with respect to a plate surface of the annular plate, and each of the insulated winding parts have the insulated winding holding part at a common height position with respect to the plate surface of the annular plate.

4. A multiplexed resolver, comprising:

an assembly in which m stator yokes are assembled, wherein m is an integer; and a pair of slot insulators each according to claim 1, the assembly being sandwiched between the pair of slot insulators so that: one of the pair of the slot insulators houses p stator yokes in insertion grooves thereof; and the other of the pair of the slot insulators houses q stator yokes in insertion grooves thereof, wherein each of p and q is an integer, and the sum of p and q is m.

* * * * *